United States Patent [19]

Seth

[11] 4,225,509

[45] Sep. 30, 1980

[54] PROCESS FOR PRODUCING OVERBASED ALKALINE EARTH HYDROCARBYL SULFONATES

[75] Inventor: Kishankumar K. Seth, Baton Rouge, La.

[73] Assignee: Ethyl Corporation, Richmond, Va.

[21] Appl. No.: 81,208

[22] Filed: Oct. 2, 1979

[51] Int. Cl.³ ............... C07C 143/24; C07C 139/00

[52] U.S. Cl. ................ 260/505 N; 260/505 P; 260/504 A

[58] Field of Search ............ 260/505 N, 505 P, 504 A

[56] References Cited

U.S. PATENT DOCUMENTS

| | | | |
|---|---|---|---|
| 2,861,951 | 11/1958 | Carlyle | 252/33 |
| 2,865,957 | 12/1958 | Logan | 260/504 |
| 3,027,325 | 3/1962 | McMillen | 252/33 |
| 3,057,896 | 10/1962 | Schlicht | 260/435 |
| 3,312,618 | 4/1967 | LeSuer | 252/33 |
| 3,488,284 | 1/1970 | LeSuer | 252/33 |
| 3,609,076 | 9/1971 | Blaha | 252/33.3 |

*Primary Examiner*—Alan Siegel
*Attorney, Agent, or Firm*—Donald L. Johnson; Robert A. Linn; Joseph D. Odenweller

[57] ABSTRACT

Overbased alkaline earth metal hydrocarbyl sulfonates are made by injecting carbon dioxide into a mixture of hydrocarbon sulfonic acid, alkaline earth metal base and lower alkanol. Solids are removed using a centrifuge or filter forming a cake of such solids and hydrocarbyl sulfonic acid values. The cake is mixed with an aqueous acid which forms a water-soluble alkaline earth metal salt. The resulting organic phase is separated and hydrocarbyl sulfonic acid is recovered from it.

8 Claims, No Drawings

PROCESS FOR PRODUCING OVERBASED ALKALINE EARTH HYDROCARBYL SULFONATES

BACKGROUND OF THE INVENTION

Overbased alkaline earth metal hydrocarbyl sulfonates are used in formulating lubricating oil for use in the crankcase of internal combustion engines. Methods of making such overbased sulfonates are well known. Suitable methods are described in U.S. Pat. No. 2,861,951; U.S. Pat. No. 2,865,957; U.S. Pat No. 3,027,325; U.S. Pat No. 3,057,896; U.S. Pat. No. 3,312,618; U.S. Pat. No. 3,488,284 and U.S. Pat. No. 3,609,076, all of which are incorporated herein by reference for their disclosure of how to conduct an overbasing process.

SUMMARY

According to the present invention a conventional overbasing process is conducted by injecting carbon dioxide into a mixture of hydrocarbon diluent, hydrocarbyl sulfonic acid, alkanol promoter and alkaline earth metal base. After carbonation, alkanol promoter is distilled out and the reaction mixture clarified by centrifuging and/or filtering. The liquid phase contains the overbased alkaline earth metal sulfonate. The solids which are removed form a cake which traps a substantial amount of hydrocarbyl sulfonic acid value. In the present invention this hydrocarbyl sulfonic acid value is recovered by dissolving the soluble solids in the cake in an aqueous acid (e.g. HCl) and separating the released organic phase which contains hydrocarbyl sulfonic acid suitable for recycle to a subsequent overbasing reaction.

DESCRIPTION OF THE PREFERRED EMBODIMENTS

A preferred embodiment of the invention is an improvement in a process for making an overbased alkaline earth metal hydrocarbyl sulfonate by the process comprising (1) adding an alkaline earth metal base selected from the group consisting of oxides and hydroxide of calcium, magnesium and barium and mixtures thereof to a hydrocarbyl sulfonic acid or alkaline earth metal salt thereof, (2) adding a lower alkanol promoter, (3) injecting carbon dioxide into the mixture, (4) distilling to remove volatiles, and (5) centrifuging and/or filtering to remove solids and obtain a clear overbased alkaline earth metal hydrocarbon sulfonate. According to the improvement, hydrocarbyl sulfonic acid value trapped in the solids are recovered by (a) mixing the solids with an aqueous acid which forms a water-soluble alkaline earth metal salt thereby dissolving alkaline earth metal compounds in the solids, (b) separating the resultant mixture into an aqueous phase and an organic phase, and (c) removing the organic phase containing hydrocarbyl sulfonic acid.

Methods of conducting the overbasing reaction are well known and are described in the background section. In essence, a hydrocarbyl sulfonic acid dissolved in process oil is mixed with alkaline earth metal base in an amount in excess of the stoichiometric amount required to neutralize the acid. The hydrocarbyl sulfonic acid may be a petroleum sulfonic acid or an aryl sulfonic acid such as formed by sulfonating alkylbenzenes having a molecular weight of about 300–2000. Optionally, an alkaline earth metal salt of the hydrocarbyl sulfonic acid may be used in place of the sulfonic acid.

The alkaline earth metal base may be calcium oxide, calcium hydroxide, magnesium oxide, magnesium hydroxide, barium oxide, barium hydroxide or any mixtures thereof. Preferred bases are calcium oxide and magnesium oxide in a finely divided active form.

The amount of base is in excess of that required to neutralize the sulfonic acid. A useful range is from about 1.2 to 10 times the stoichiometric amount.

To this mixture is added a promoter. The preferred promoters are hydroxy compounds such as glycols, monoalkyl glycolethers and alkanols. The more preferred promoters are lower alkanols, especially methanol. Good results are obtained using 2–20 moles of alkanol per mole of alkaline earth metal base.

A volatile hydrocarbon solvent such as hexane, heptane or petroleum ether is usually included in the mixture to lower viscosity.

Other promoters such as ammonia, or ammonium salts of organic acids (e.g. ammonium formate, ammonium acetate and the like) can be used. A useful range is about 0.05–0.5 mole per mole of alkaline earth metal base.

Carbon dioxide is injected into the vigorously stirred mixture. This is done anywhere from ambient temperature up to about 100° C. or the reflux temperature of the reaction mixture. In a preferred mode the carbon dioxide injection is started at about 30° C. and the temperature allowed to rise to about 40°–60° C. from the heat of reaction. After carbonation is complete the temperature drops and carbon dioxide is no longer absorbed.

Following carbonation the volatile material (e.g. water, alkanol, petroleum ether and the like) are usually distilled out leaving a solution of overbased alkaline earth metal hydrocarbyl sulfonate in process oil containing a substantial amount of solid material, mainly alkaline earth metal carbonate. The mixture is centrifuged or filtered to obtain a clear bright overbased alkaline earth metal hydrocarbyl sulfonate suitable for addition to engine crankcase oil. Optionally, the reaction mixture can be centrifuged to remove most of the solids and then filtered to obtain a bright clear product.

The resulting centrifuge cake or filter cake contains trapped hydrocarbyl sulfonic acid value. These are usually in the form of alkaline earth metal salts of hydrocarbyl sulfonic acid. In a commercial operation the amount of trapped sulfonic acid can reach significant quantities. In the past such material has been discarded with the filter or centrifuge cake. According to the present invention this cake is mixed with an aqueous acid which acid forms a water soluble salt with the alkaline earth metal base. Such acid includes hydrochloric acid, acetic acid, formic acid, hydrobromic acid, hydriodic acid or nitric acid. Of these the preferred acid is aqueous HCl. Concentrations up to saturated aqueous HCl are useful. A preferred concentration is about 10 to 30 wt % HCl.

The amount of aqueous acid should be an amount which is sufficient to at least neutralize the cake. Preferably an excess is used. A useful range is about 1–10 equivalents of aqueous acid per equivalent of alkaline earth metal in the cake. A more preferred range is about 1 to 3 equivalents of aqueous acid per equivalent of alkaline earth metal.

The cake and aqueous acid can be mixed at any temperature. A useful temperature range is about 20°–70° C. Preferably the mixture is formed at ambient temperature and the heat of neutralization allowed to raise the temperature to about 50°–70° C.

The mixture can be made by adding the aqueous acid to the cake or adding the cake to the acid. Temperature is more easily controlled by adding the cake in increments to the aqueous acid.

Although not required, a hydrocarbon solvent is preferably included in the mixture. Preferably this is a volatile hydrocarbon solvent such as hexane, heptane, petroleum ether and the like, similar to that used in the overbasing reaction.

The mixing of the centrifuge or filter cake and acid is continued until most of the alkaline earth metal compounds have been neutralized thus extracting the alkaline earth metal into the aqueous phase. The aqueous phase and organic phase are then separated. This may be done by gravity in a settling tank or in a continuous centrifuge. The organic phase contains the recovered hydrocarbyl sulfonic acid. If there are solids remaining in the organic phase such as filter-aid these can be filtered out. The organic phase is then suitable for recycle to a subsequent overbasing reaction. For this use it is not necessary to remove any hydrocarbon solvents that have been added since these are routinely used in conventional overbasing reactions.

The following examples serve to illustrate the method of carrying out the improved process.

EXAMPLE 1

In a reaction vessel was placed 65 grams of process oil, 327 grams of solvent (hexane heptane mixture), 122 grams alkylbenzene sulfonic acid (assay 1.16 meq/g, avg mol wt 476), 23 grams methanol, 18 ml aqueous ammonium hydroxide (30% $NH_3$) and 70 grams calcium oxide. The mixture was stirred vigorously while carbon dioxide was injected at a rate of about 310 ml/min. Reaction temperature rose uncontrolled to about 63° C. Carbon dioxide injection was continued at that temperature for about 75 minutes. About 47 grams of carbon dioxide was consummed. The reaction mixture was then heated to 125° C. to distill out most of the methanol and water. The reaction mixture was then cooled to about 25° C. and diluted with 110 grams of hexane heptane solvent.

The resultant reaction mixture was centrifuged to remove solids. The centrate was filtered at 20″ Hg vacuum through a filter-aid coated paper filter. The filtrate was heated to 140° C. at 20 mm Hg absol. to complete removal of volatiles giving a clear bright product with the following characteristics:
TBN: 410 mg KOH/g
Viscosity (100° C.): 79.2 cs
Calcium: 15.0 wt %
Soap: 19.2 wt %

The centrifuge cake (about 100 grams) was slurried with 50 grams of hexane and 300 grams of water. To the stirred slurry was added 200 grams of 36% aqueous HCl. This mixture was stirred for 7 minutes at 38° C. Over 99% of the solids dissolved. Stirring was stopped and the mixture allowed to separate into two phases. The upper organic phase contained the recovered alkylbenzene sulfonic acid. Volatiles were distilled from the organic phase at 200° F. under 29″ Hg vacuum leaving 64 grams of an oil solution containing about 20 wt % alkylbenzene sulfonic acid.

EXAMPLE 2

This reaction was conducted the same as Example 1 through the carbon dioxide injection, heating to distill out methanol and water and dilution with 110 grams hexane heptane solvent.

To the reaction mixture was then added 5 wt % of filter-aid and the resultant slurry filtered through a filter-aid coated paper filter using 20″ Hg vacuum. The filtrate was stripped under vacuum to remove volatiles giving a clear bright overbased calcium alkylbenzene sulfonate for use in lubricating oil formulations.

The filter cake (100 grams) was slurried with 50 grams of hexane and 100 grams of water. Then 75 grams of 36% aqueous HCl was added. Temperature rose from 25° to 48° C. The mixture was stirred for 5 minutes and then allowed to settle forming two phases. An additional 400 grams of water was added following which the organic phase was removed and filtered. The organic phase (92 grams) was vacuum stripped to remove volatiles leaving a clear bright oil solution of an alkylbenzene sulfonic acid.

In other variations of the overbasing reaction different promoters have been used such as aliphatic nitro compounds (U.S. Pat. No. 2,616,906), phenols (U.S. Pat. No. 2,616,924), thiophosphoric acid (U.S. Pat. No. 2,616,925), arylamines (U.S. Pat. No. 2,856,359; U.S. Pat. No. 2,856,360), alkanol amines or ethylenediamine (U.S. Pat. No. 2,889,279) and the like. In other variations of the process the colloidal alkaline earth metal base is formed in an alkanol medium which is then added to the oil containing a dispersant (U.S. Pat. No. 2,956,018). In these and other variations it is still necessary to remove the non-colloidal alkaline earth metal base from the solution of overbased alkaline earth metal sulfonate before it can be used as a lubricating oil additive. The essence of the present invention is applicable to such overbasing procedures. Accordingly, a further embodiment of the invention is a method of recovering hydrocarbon sulfonic acid values from a centrifuge or filter cake which contains said hydrocarbyl sulfonic acid values and solid alkaline earth metal carbonate, said method comprising (a) mixing said cake with an aqueous acid which forms a water-soluble alkaline earth metal salt and (b) separating the organic phase containing hydrocarbyl sulfonic acid from the aqueous phase.

I claim:

1. In a process for making an overbased alkaline earth metal hydrocarbyl sulfonate, said process comprising the steps of
    (1) adding an alkaline earth metal base selected from the group consisting of oxides and hydroxides of calcium, magnesium and barium and mixtures thereof to a hydrocarbyl sulfonic acid or alkaline earth metal salt thereof,
    (2) adding a lower alkanol promoter,
    (3) injecting carbon dioxide into the mixture,
    (4) distilling to remove volatiles, and
    (5) removing solids to obtain a clear overbased alkaline earth metal hydrocarbonyl sulfonate,
the improvement comprising (a) mixing said solids obtained in step (5) with an aqueous acid which forms a water-soluble alkaline earth metal salt thereby dissolving basic alkaline earth metal compound in said solids, (b) separating the resultant mixture into an aqueous phase and an organic phase and (c) removing said organic phase containing hydrocarbyl sulfonic acid.

2. A process of claim 1 wherein said aqueous acid is aqueous HCl.

3. A process of claim 2 wherein said lower alkanol is methanol.

4. A process of claim 3 wherein said alkaline earth metal base is calcium oxide, calcium hydroxide or mixtures thereof.

5. A process of claim 3 wherein said alkaline earth metal base is magnesium oxide, magnesium hydroxide or mixtures thereof.

6. A process of claim 3 wherein a hydrocarbon solvent is added to the mixture of said solid and said aqueous HCl whereby said hydrocarbyl sulfonic acid is extracted into the hydrocarbon solvent phase.

7. A process of claim 6 wherein said alkaline earth metal base is calcium oxide, calcium hydroxide or mixtures thereof.

8. A process of claim 6 wherein said alkaline earth metal base is magnesium oxide, magnesium hydroxide or mixtures thereof.

* * * * *